US007145160B2

(12) United States Patent
Chun

(10) Patent No.: US 7,145,160 B2
(45) Date of Patent: Dec. 5, 2006

(54) METHOD AND APPARATUS TO DISCRIMINATE THE CLASS OF MEDIUM TO FORM IMAGE

(75) Inventor: Young-sun Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 111 days.

(21) Appl. No.: 10/910,377

(22) Filed: Aug. 4, 2004

(65) Prior Publication Data

US 2005/0029474 A1 Feb. 10, 2005

(30) Foreign Application Priority Data

Aug. 5, 2003 (KR) ...................... 10-2003-0054207

(51) Int. Cl.
*G01N 21/86* (2006.01)

(52) U.S. Cl. ............................. 250/559.07; 250/559.4; 347/16; 347/19

(58) Field of Classification Search ........... 250/559.07, 250/559.16–559.18, 559.27, 559.4; 358/1.9, 358/1.18; 347/16, 19; 399/389
See application file for complete search history.

(56) References Cited

U.S. PATENT DOCUMENTS 5,056,042 A 10/1991 Lieb
5,139,339 A * 8/1992 Courtney et al. ........... 356/446
5,521,692 A 5/1996 Bares
5,925,889 A * 7/1999 Guillory et al. ....... 250/559.16
6,291,829 B1 * 9/2001 Allen et al. ............ 250/559.07
6,325,505 B1 * 12/2001 Walker ....................... 347/105
6,386,669 B1 * 5/2002 Scofield et al. ............... 347/14
6,389,241 B1 5/2002 Cernusak et al.
6,425,650 B1 * 7/2002 Walker et al. ................ 347/14
6,520,614 B1 * 2/2003 Kaneko ....................... 347/14
6,557,965 B1 * 5/2003 Walker et al. ................ 347/16
6,561,643 B1 * 5/2003 Walker et al. .............. 347/105
6,600,167 B1 * 7/2003 Sano ..................... 250/559.11
6,605,819 B1 * 8/2003 Ross .......................... 250/556
6,655,778 B1 * 12/2003 Arquilevich et al. .......... 347/19
6,794,668 B1 * 9/2004 Barnes .................. 250/559.27
6,838,687 B1 * 1/2005 Tullis et al. ........... 250/559.07
6,894,262 B1 * 5/2005 Gao et al. ................ 250/208.1
6,900,449 B1 * 5/2005 Bolash et al. .......... 250/559.16
2003/0091351 A1 5/2003 Weaver et al.

FOREIGN PATENT DOCUMENTS

JP 57210359 12/1982
JP 58172644 10/1983
JP 62040475 2/1987

(Continued)

OTHER PUBLICATIONS

Korean Office Action dated May 19, 2005.

(Continued)

*Primary Examiner*—Thanh X. Luu
*Assistant Examiner*—Davienne Monbleau
(74) *Attorney, Agent, or Firm*—Staas & Halsey LLP

(57) ABSTRACT

A method and an apparatus to determine a class of a medium on which an image is formed. The method includes emitting light to the medium; sensing the light affected by the medium; collecting a first predetermined number of features which are represented by a relationship between a parameter and an intensity of the light and determining the class of the medium using the collected features. One of a light emitting part and a light receiving part move to emit or sense the light, respectively, and the parameter varies with the movement of the light emitting part or the light receiving part.

33 Claims, 11 Drawing Sheets

FOREIGN PATENT DOCUMENTS

| | | |
|---|---|---|
| JP | 07-144794 | 6/1995 |
| JP | 10-039556 | 2/1998 |
| JP | 10-160687 | 6/1998 |
| JP | 10171218 | 6/1998 |
| JP | 2000-259885 | 9/2000 |
| JP | 2002-167082 | 6/2002 |
| JP | 2002-188997 | 7/2002 |
| KR | 2001-0089737 | 10/2001 |

OTHER PUBLICATIONS

I.T. Jolliffe, “Principal Component Analysis”, Oct. 1, 2002, p. 1-1 through 1-7.
Trevor Hastie et al;“The Elements of Statistical Learning”, Aug. 9, 2001, p. 2-1 through 2-3.
Hrushikesh N. Mhaskar et al., “Fundamentals of Approximation Theory”, Oct. 2000, p. 3-1 through 3-3.

* cited by examiner

METHOD AND APPARATUS TO DISCRIMINATE THE CLASS OF MEDIUM TO FORM IMAGE

CROSS-REFERENCE TO RELATED APPLICATIONS

This application claims the benefit of Korean Application No. 2003-54207, filed Aug. 5, 2003, in the Korean Intellectual Property Office, the disclosure of which is incorporated herein by reference.

BACKGROUND OF THE INVENTION

1. Field of the Invention

The present invention relates to an apparatus to form an image, such as a printer, and more particularly, to a method and an apparatus to discriminate the class of a medium to form an image.

2. Description of the Related Art

In general, image forming apparatuses discriminate the classes (types) of media to uniformly form an image on the media regardless of the classes.

A conventional image forming apparatus (not shown) includes a light emitting part which emits a light beam to a medium and a plurality of light receiving parts which sense the light beam reflected from the medium. In other words, the light emitting part emits a light beam to a point of the medium, and the light receiving part senses the light beams reflected or diverged from the medium at various angles. Intensities of the light beams sensed at various angles are used to discriminate (determine) the classes of the media.

If the number of light receiving parts increases, the volume and production cost of the conventional image forming apparatus may increase. Thus, the conventional image forming apparatus includes a finite number of light receiving parts. Since the media discrimination method performed by the conventional image forming apparatus cannot sense the intensity of light at various angles, it cannot definitely discriminate the classes of the media with certainty. In addition, the structure of the conventional image forming apparatus is complicated and production costs thereof increase due to the emission of light to the point of the medium and the sensing of the light reflected from the point.

SUMMARY OF THE INVENTION

Accordingly, it is an aspect of the present invention to provide a method of discriminating classes of media to form images in which the classes (or types) of the media can be discriminated (determined) using features collected by moving one of a light emitting part and a light receiving part over the media.

Accordingly, it is another aspect of the present invention to provide an apparatus to discriminate classes of media to form images in which the classes of the media can be discriminated using features collected by moving one of a light emitting part and a light receiving part over the media.

Additional aspects and/or advantages of the invention will be set forth in part in the description which follows and, in part, will be obvious from the description, or may be learned by practice of the invention.

The foregoing and/or other aspects of the present invention are achieved by providing a method of determining a class of a medium to form an image using an image forming apparatus which includes a light emitting part that emits light and a light receiving part that senses the light, the method including: emitting the light to the medium; sensing the emitted light which is affected by the medium; collecting a first predetermined number of features which are represented by a relationship between a parameter of the medium and an intensity of the light sensed by the light receiving part; and determining the class of the medium using the collected features, wherein one of the light emitting part and the light receiving part moves to emit or sense the light, and the parameter varies with the movement of one of the light emitting part or the light receiving part.

The foregoing and/or other aspects of the present invention are also achieved by providing an apparatus to discriminate a class of a medium on which an image is formed, the apparatus including: a light emitting part which emits light to the medium; a light receiving part which senses light affected by the medium; a carrier which moves with the light emitting part or the light receiving part in response to a movement control signal; a feature collector which collects a first predetermined number of features of the medium; and a media class discriminator which determines the class of the medium using the collected features, wherein the features are represented by a relationship between a parameter of the medium, which varies with the movement of the carrier, and an intensity of the light sensed by the light receiving part.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
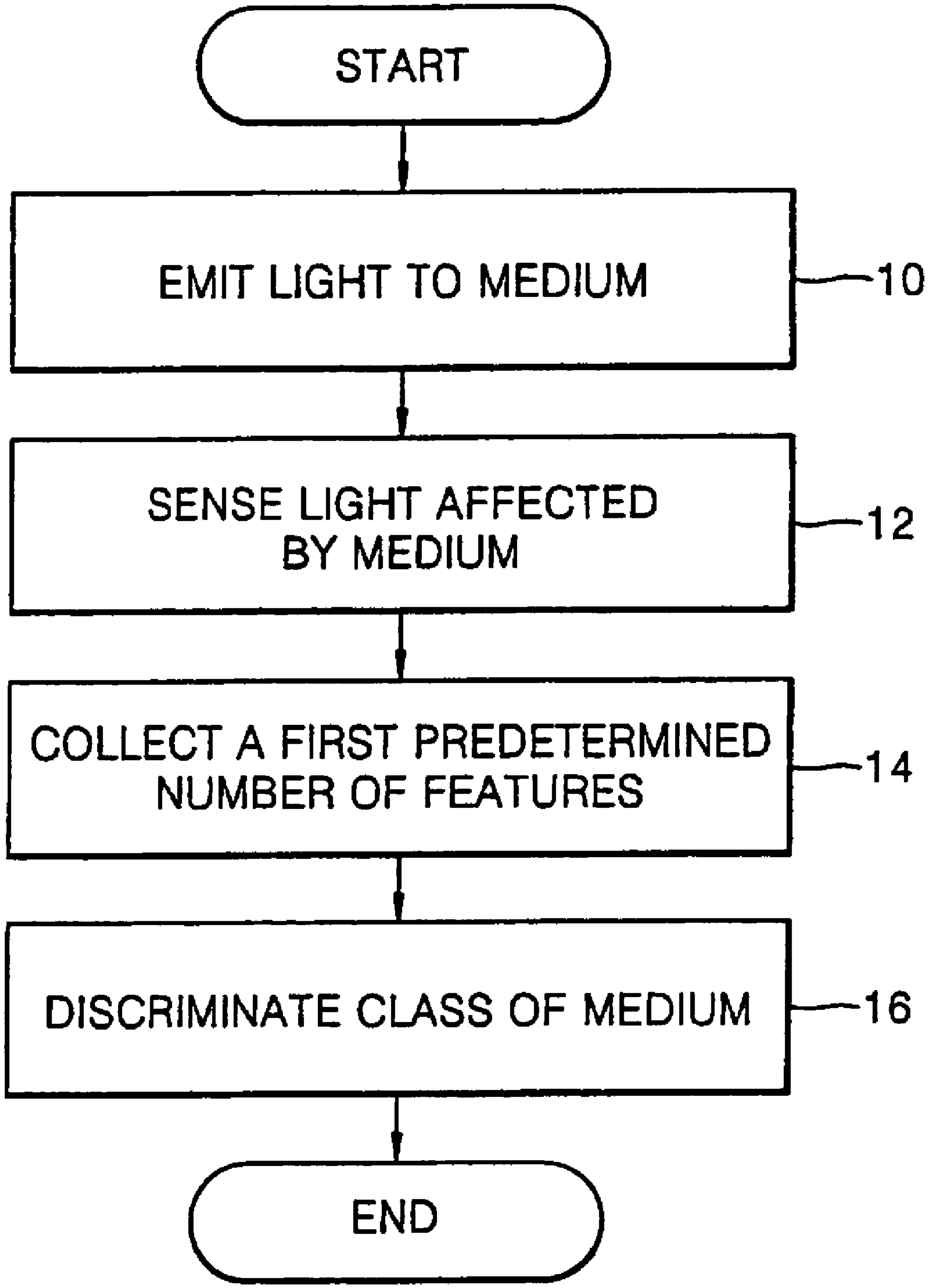
FIG. 1 is a flowchart for explaining a method of discriminating classes of media to form images, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart for explaining a method of discriminating classes of media (i.e., letter sized paper, A4, envelopes, etc.) to form images, according to an embodiment of the present invention. The method includes operations 10 and 12 of emitting light to a medium and sensing the light from the medium, and operations 14 and 16 of collecting a first predetermined number of features and discriminating the class of the medium.

The method of FIG. 1 is performed by an image forming apparatus which uses a class of a discriminated medium to form an image. Here, the image forming apparatus includes a light emitting part which emits light and a light receiving part which senses the light. For example, if the image forming apparatus is a printer, the medium corresponds to a sheet of printing paper on which an image is to be formed.

In operation 10, the light emitting part emits light to a medium. Here, the light emitted by the light emitting part may be formed with a predetermined shape, on the media.

After operation 10, in operation 12, the light affected by the medium is sensed. Here, according to the embodiment of the present invention, the light affected by the medium corresponds to light reflected from the medium or light passing the medium.

In the related art, a light emitting part and a light receiving part are fixed. However, in the present invention, by moving only one of the light emitting part and the light receiving part, light is emitted or sensed so as to perform operations 10 and 12. For example, the light emitting part may move to emit the light in operation 10, and the light receiving part may be fixed to sense the light in operation 12. Alternately, the light emitting part may be fixed to emit the light in operation 10, and the light receiving part may move to sense the light in operation 12. Here, the light emitting part or the light receiving part moves in at least one of horizontal and vertical directions, and the position to which the light emitting part or the light receiving part moves may be predetermined.

After operation 12, in operation 14, a first predetermined number, M, of features are collected. Here, the first predetermined number M is small, and the features are represented by the relationship between at least one parameter, which varies with the movement of the light emitting part or the light receiving part, and the intensity of the light sensed by the light receiving part. Here, the parameter corresponds to a movement distance or time which is represented in a 3-dimensinal space, and the movement distance may be represented as a position by orthogonal coordinates or as an angle by polar coordinates. Thus, the intensity of the sensed light can be represented as a parameter. The intensity of the sensed light may draw various shapes of envelopes according to variations in a relative distance between the light emitting part and the light receiving part and the class of the medium reflecting or transmitting the light. In other words, when the intensity of the light included in the collected features is a one coordinate axis and the parameter is the other coordinate axis, the collected features may draw various shapes of envelopes.

The collected features can be represented as in Equation 1:

$$X_{MxN} = \begin{bmatrix} x_{11} & x_{12} & \cdots & x_{1N} \\ x_{21} & x_{22} & \cdots & x_{2N} \\ \vdots & \vdots & \vdots & \vdots \\ x_{M1} & x_{M2} & \cdots & x_{MN} \end{bmatrix} = \begin{bmatrix} \overline{x}_1 \\ \overline{x}_2 \\ \vdots \\ \overline{x}_M \end{bmatrix} \quad (1)$$

wherein N−1 denotes the number of parameters, $\overline{X}_{M\times N}$ denotes the features, and $\overline{x}_m$ (1 m M) denotes a feature which is represented as in Equation 2:

$$\overline{x}_m=[x_{m1}\ X_{m2}\ \ldots\ x_{mN}] \quad (2)$$

wherein $x_{m1}$ denotes the intensity of the sensed light, and $X_{mn}$ (2 n N) denotes the parameters.

A method of determining the first predetermined number used in operation 14 according to the embodiment of the present invention will now be explained.

Figure 2:
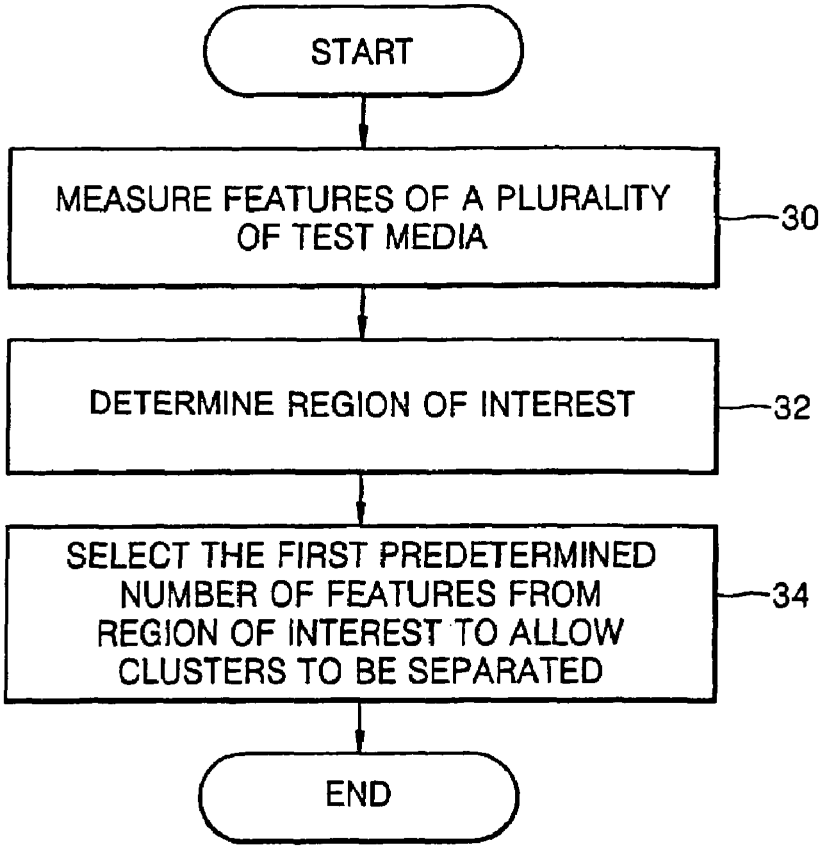
FIG. 2 is a flowchart for explaining a method of determining a first predetermined number, according to the method of FIG. 1.

FIG. 2 is a flowchart for explaining a method of determining the first predetermined number. The method includes operations 30 and 32 of measuring features and determining a region of interest (ROI) and operation 34 of determining the first predetermined number in the ROI.

The method of FIG. 2 may be performed, for example, when an image forming apparatus is developed, i.e., before the image forming apparatus performs the method of FIG. 1.

In operation 30, features of a plurality of test media are measured. Here, the test media refer to media which may be discriminated by the media discriminating method of the embodiment of the present invention and tested when the image forming apparatus is developed. To perform operation 30, light is emitted to discriminate all test media and the light reflected from or passing the test media is sensed to extract features of the test media. Here, the light emitting part or the light receiving part may move during emitting or sensing light.

After operation 30, in operation 32, an ROI, which includes features except features unrelated to the classes of the test media and common to all of the test medias, are determined. The features measured in operation 30 are classified into features unrelated to the classes of the test media and features related to the classes of the test media. Thus, in operation 32, the ROI, which includes features which are common to the test media among features that are related to the classes of the test media, is determined. In other words, in operation 16, a region including available features is limitedly determined as the ROI.

After operation 32, in operation 34, a virtual number of features are selected from the features included in the determined ROI using various mathematical techniques until clusters are separated in a virtual feature space, and a virtual number selected when the clusters are separated is determined as the first predetermined number. Here, the virtual feature space includes corresponding points of the virtual number of intensities of light, and the clusters refer to groups of corresponding points in the virtual feature space. For example, when an $m^{th}$ feature $\overline{x}_m$ and a $m+j^{th}$ (j is a random number) feature $\overline{x}_{m+j}$ as many as the virtual number, "2", among features are selected, the vertical axis of the virtual feature space is an intensity $x_{(m+j)1}$ of light included in the $m^{th}$ feature $\overline{x}_m$ and the horizontal axis of the virtual feature space is an intensity $x_{m1}$ of light included in the m+$j^{th}$ feature $\overline{x}_{m+j}$. Here, if the clusters are separated in the virtual feature space, the virtual feature space is determined as a final feature space and the virtual number is determined as the first predetermined number.

As described above, in operation 34, the features are determined when the first predetermined number is determined. Therefore, movement positions or times of the light emitting part or the light receiving part are predetermined as represented by the parameters $x_{mn}$ of the virtual number of features, the virtual number being determined as the first predetermined number.

According to the embodiment of FIG. 1, the various mathematical techniques through which the virtual number can be adjusted until the clusters are separated include a principal component analysis (PCA), a regression analysis, an approximate technique, and so forth. Here, the PCA is described in an article entitled "Principal Component Analysis", written by I. T. Jolliffe, published by Springer Verlag, Oct. 1, 2002, $2^{nd}$ edition, International Standard Book Number (ISBN) 0387954422. The technique in which the virtual number is reduced using regression analysis is disclosed in an article entitled "The Elements of Statistical Learning", published by Springer Verlag, Aug. 9, 2001, ISBN 0387952845. The approximate technique is disclosed in an article entitled "Fundamentals of Approximation Theory", written by Hrushikesh N. Mhaskar and Devidas V. Pai, published by CRC Press, October 2000, ISBN 0849309395.

After operation 14, in operation 16, the class of the medium is determined using the collected features.

Figure 3:
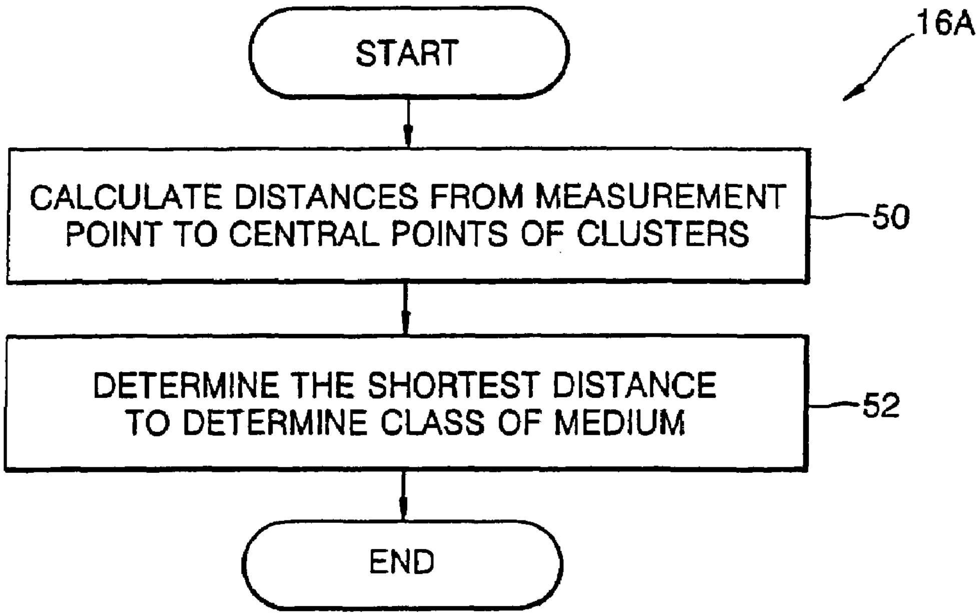
FIG. 3 is a flowchart for explaining an embodiment of operation 16 of FIG. 1.

FIG. 3 is a flowchart for explaining an embodiment 16A of operation 16 of FIG. 1. Operation 16A includes operations 50 and 52 of determining the class of the medium using a central point of the clusters in the final feature space.

After operation 14, in operation 50, distances from a measurement point, which is formed by the features collected in the final feature space showing the relationship among the first predetermined number of intensities of light, to predetermined central points of the clusters in the final feature space are calculated. Here, the first predetermined number of collected features may be represented as a point, i.e., the measurement point, in the final feature space.

After operation 50, in operation 52, the shortest distance is selected from the calculated distances, a cluster with a predetermined central point used to calculate the shortest distance is identified, and a class of a medium corresponding to the identified cluster is determined as the class of the medium on which an image is to be formed.

When the first predetermined number is determined as "2", the $m^{th}$ feature $\overline{x}_m$ and the m+$j^{th}$ feature $\overline{x}_{m+j}$ are selected when the first predetermined number is determined, first, second, and third clusters exist in the final feature space, and the first, second, and third clusters correspond to a plain medium, a transparent medium, and a photographic medium, respectively.

Figure 4:
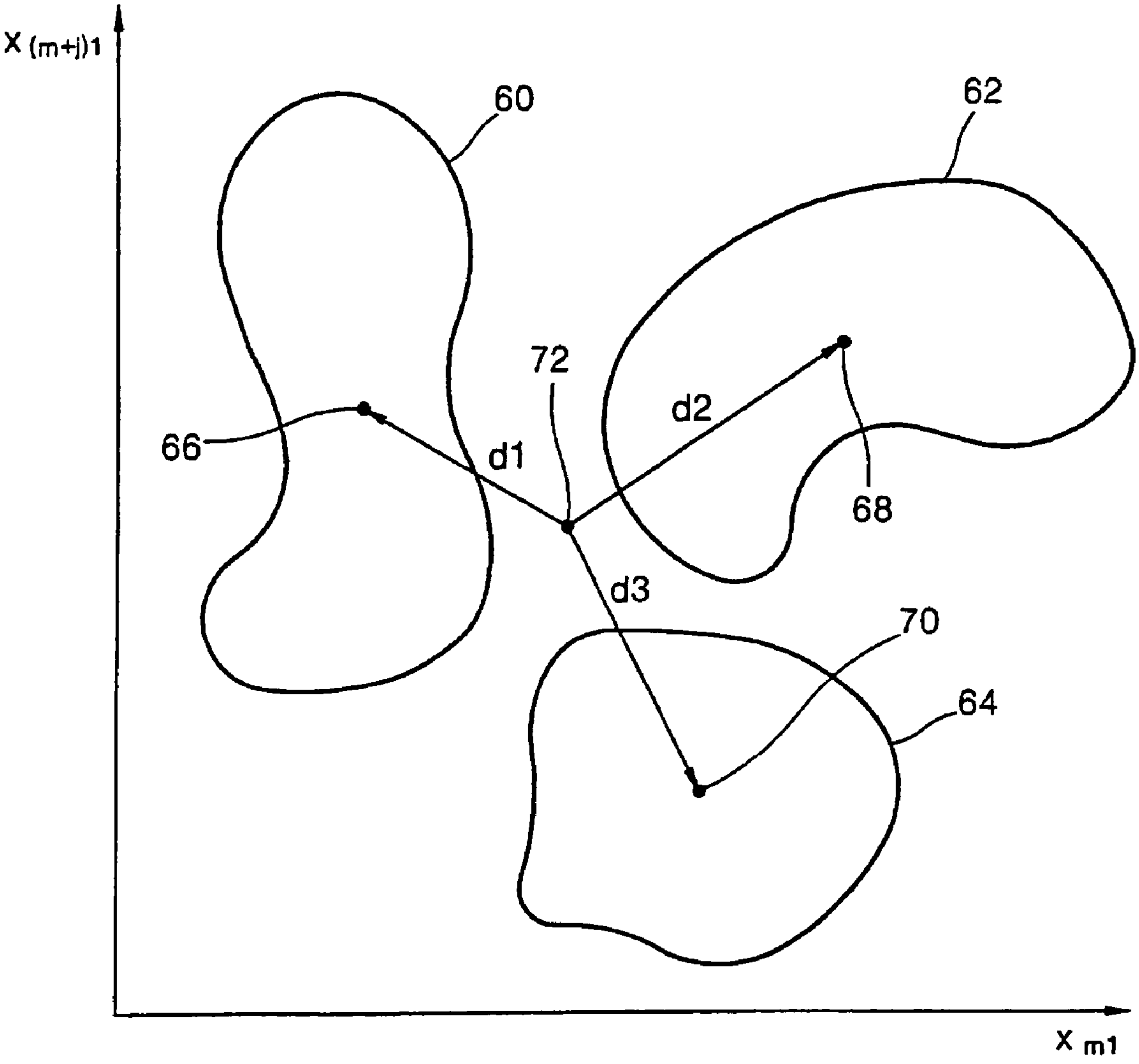
FIG. 4 is an exemplary view showing a final feature space for explaining operation 16A of FIG. 3.

Operation 16A of FIG. 3 will now be explained. FIG. 4 is an exemplary view for showing the final feature space for explaining operation 16A of FIG. 3. The final feature space includes a measurement point 72, and first, second, and third clusters 60, 62, and 64. Here, the first, second, and third clusters 60, 62, and 64 include predetermined central points 66, 68, and 70, respectively.

In operation 50, distances $d_1$, $d_2$, and $d_3$ from the measurement point 72 to the predetermined central points 66, 68, and 70 are calculated. The shortest distance of the distances $d_1$, $d_2$, and $d_3$ is also calculated in operation 52. If the shortest distance is $d_1$, the first cluster 60 with the predetermined central point 66 used to calculate the distance $d_1$ is identified, and the plain medium corresponding to the identified first cluster 60 is determined as the medium on which the image is to be formed.

A method of calculating boundaries and central points of the clusters included in the final feature space used in operation 16A of FIG. 3 will now be described.

Figure 5:
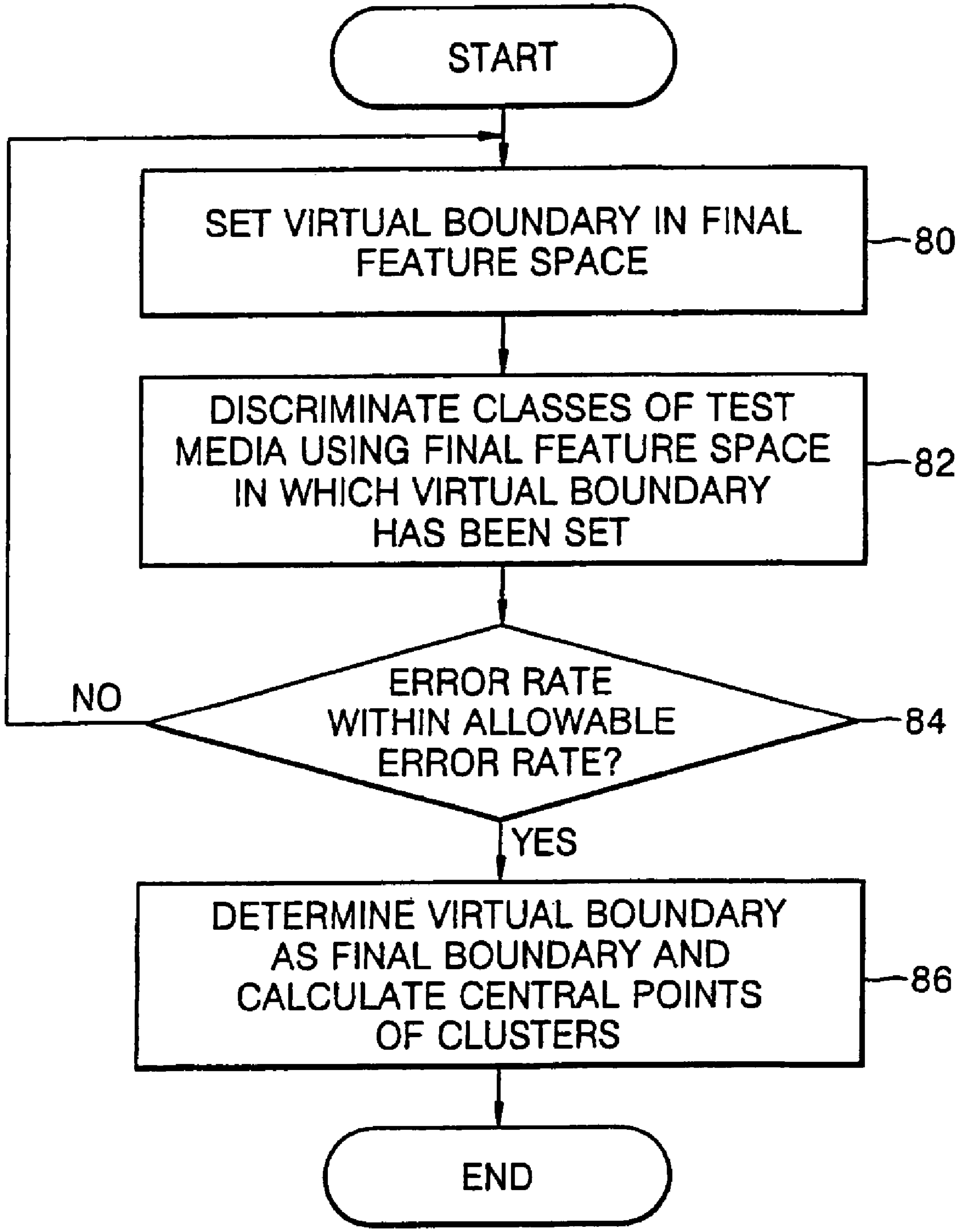
FIG. 5 is a flowchart for explaining a method of obtaining boundaries and central points of clusters in the final feature space.

FIG. 5 is a flowchart for explaining a method of obtaining boundaries and predetermined central points of the clusters in the final feature space. The method includes operations 80, 82, and 84 of setting virtual boundaries and discriminating classes until an error rate is within an allowable error rate and operation 86 of determining a final boundary and calculating the central points of the clusters.

The method of FIG. 5 may be performed, for example, when the image forming apparatus is developed, i.e., before the image forming apparatus performs the method of FIG. 1.

In operation 80, virtual boundaries between the clusters separated in the final feature space are set.

After operation 80, in operation 82, the classes of the test media are discriminated using the final feature space in which the virtual boundaries have been set. To perform operation 82, central points of virtual clusters discriminated in the final feature space by the virtual boundaries are calculated, a virtual cluster with a central point used for calculating the shortest distance of distances from a test measurement point to central points of the virtual clusters is identified, and the class of a medium corresponding to the identified virtual cluster is determined as a class of a test medium. Here, the test measurement point is not the measurement point formed by the features collected in operation 14, but a measurement point formed by the features collected in the method of FIG. 5 to calculate the final boundary and central point.

After operation 82, in operation 84, a determination is made as to whether an error rate of failing to discriminate the classes of the test media is within an allowable error rate. For example, the developer of the image forming apparatus determines whether the classes of the test medium have been accurately discriminated between in operation 82 to determine whether the error rate is within the allowable error rate.

If in operation 84, it is determined that the error rate is not within the allowable error rate, the process returns to operation 80 to set a new virtual boundary in the final feature space.

If in 84, it is determined that the error rate is within the allowable error rate, in operation 86, the virtual boundaries are determined as final boundaries and central points of clusters on the final feature space in which the final boundaries have been determined are calculated.

Figure 6:
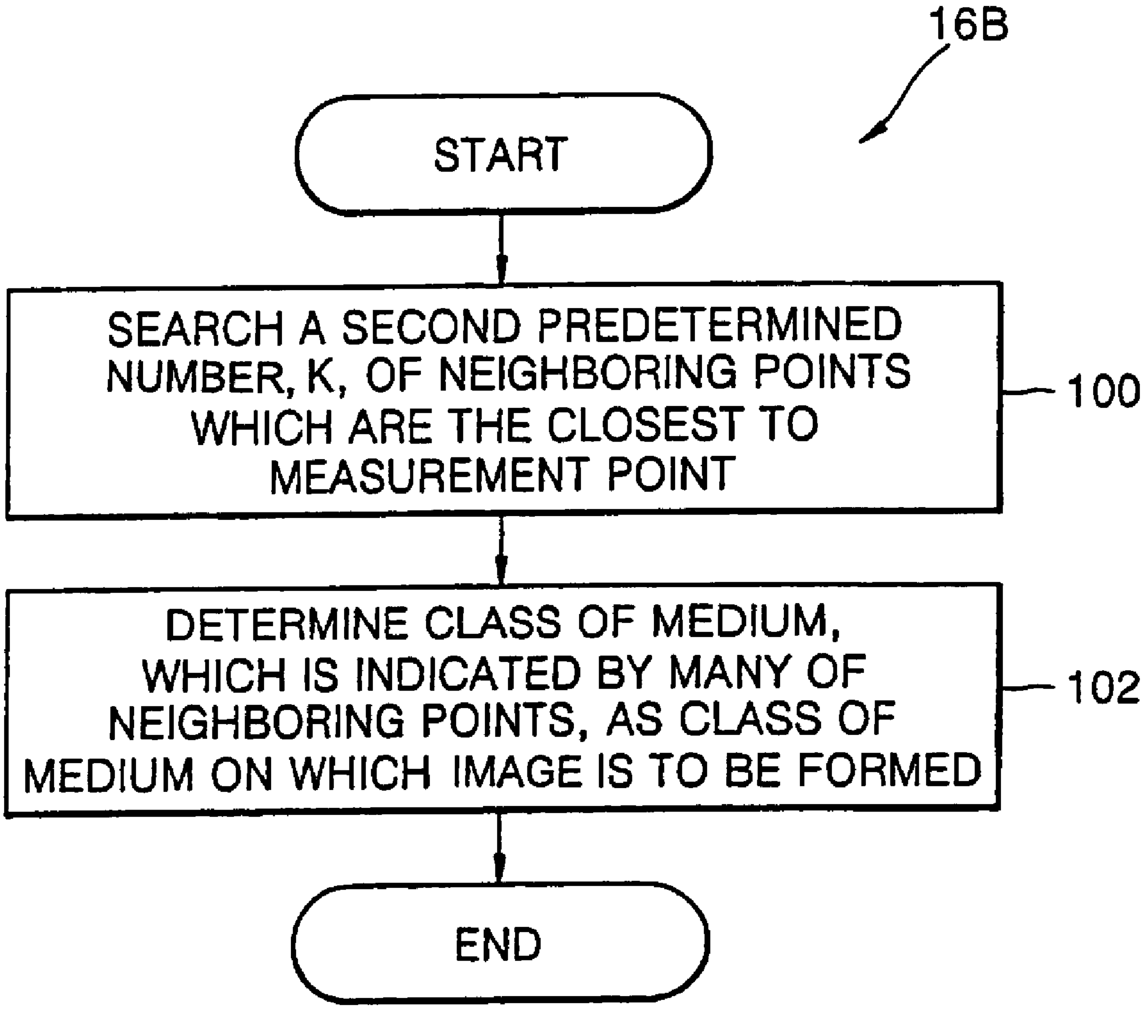
FIG. 6 is a flowchart for explaining another embodiment of operation 16 of FIG. 1.

FIG. 6 is a flowchart for explaining another embodiment 16B of operation 16 of FIG. 1. Operation 16B includes operations 100 and 102 of searching neighboring points and determining the class of the medium using points neighboring the measurement point.

After operation 14, in operation 100, a second predetermined number, K, of neighboring points, which are closest to the measurement point formed by the features collected in the final feature space showing the relationship of the first predetermined number of intensities of light are searched. Here, K is an odd number.

After operation 100, in operation 102, a class of a medium, which is indicated by labels of the second predetermined number of neighboring points, is determined as the class of the medium on which the image is to be formed. Here, a label of a $p^{th}$ (1 p K) neighboring point of the second predetermined number of neighboring points includes information on a class of a medium corresponding to the $p^{th}$ neighboring point.

Figure 7:
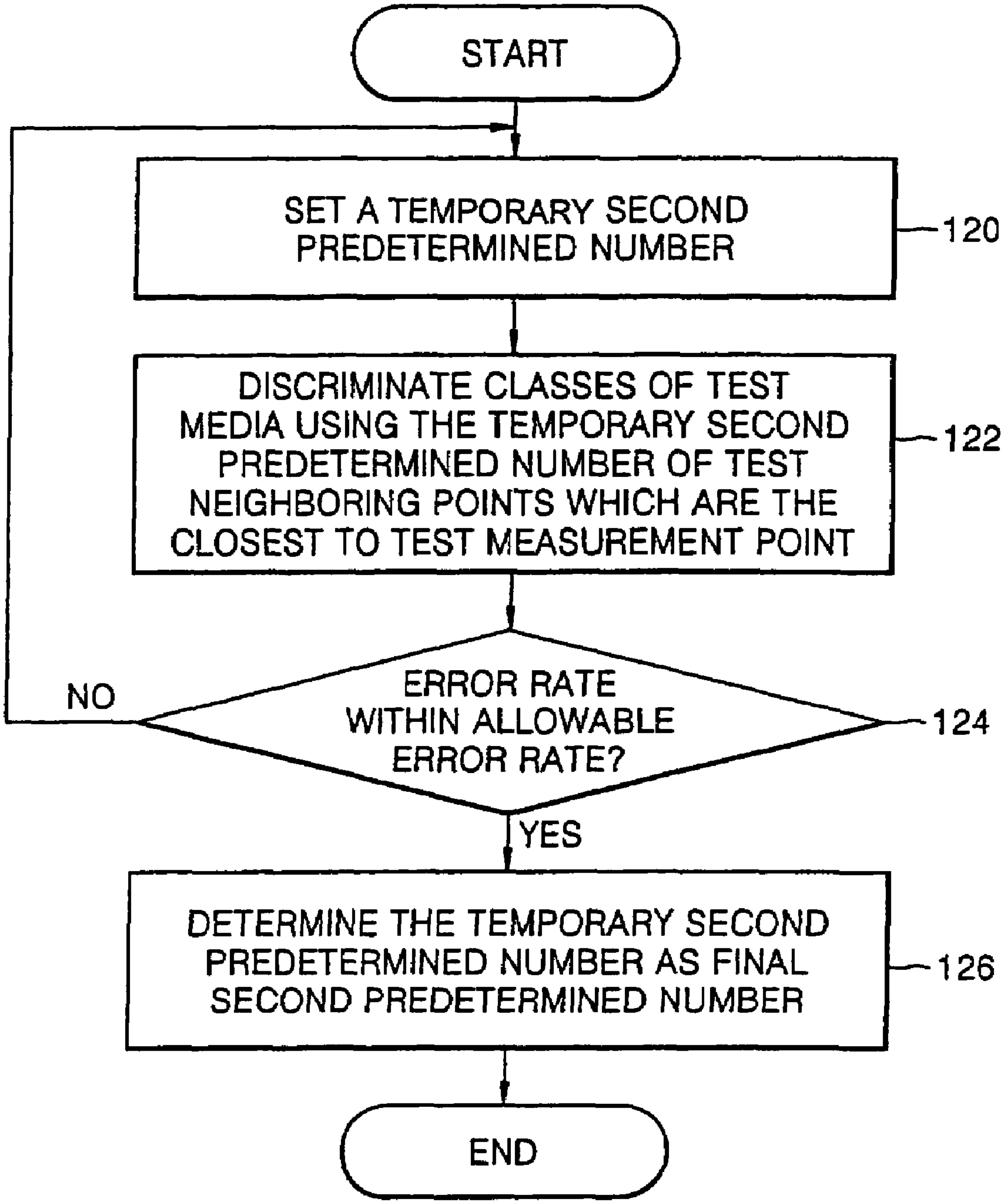
FIG. 7 is a flowchart for explaining a method of determining a second predetermined number, according to the embodiment of the present invention.

FIG. 7 is a flowchart for explaining a method of determining the second predetermined number. The method includes operations 120, 122, and 124 of continuously setting a temporary second predetermined number, and, discriminating classes of test media until the error rate is within the allowable error rate and operation 126 of determining a final second predetermined number.

The method of FIG. 7 may be performed, for example, when the image forming apparatus is developed, i.e., before the image forming apparatus performs the method of FIG. 1.

In operation 120, a temporary second predetermined number is set. After operation 120, in operation 122, the temporary second predetermined number of test neighboring points, which are the closest to the test measurement point, are calculated and, the classes of the test media are discriminated using the test measurement point and the test neighboring points. Here, the test measurement point is not the measurement point formed by the features collected in operation 14, but the point formed in the final feature space by the features measured to obtain the second predetermined number when the image forming apparatus is developed. To perform operation 122, a class of a medium, which is indicated by many of the temporary second predetermined number of test neighboring points, is determined as a class of a test medium.

In operation 124, a determination is made as to whether the error rate of failing to discriminate the classes of the test media in operation 122 is within the allowable error rate. If in operation 124, it is determined that the error rate is not within the allowable error rate, the process returns to operation 120 to set the temporary second predetermined number. In this case, the second predetermined number may increase so as to be a new temporary second predetermined number.

If in operation 124, it is determined that the error rate is within the allowable error rate, in operation 126, the temporary second predetermined number is determined as a final second predetermined number.

Figure 8:
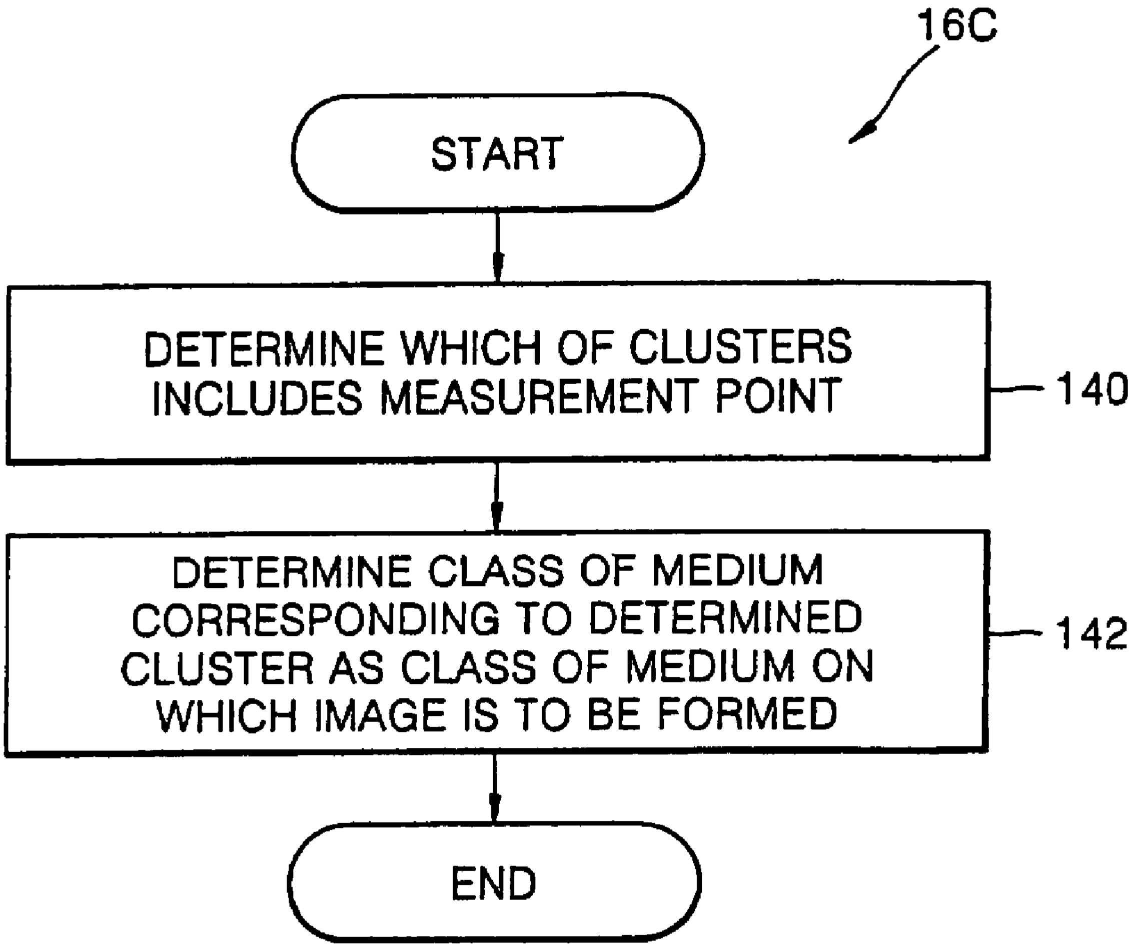
FIG. 8 is a flowchart for explaining still another embodiment of operation 16 of FIG. 1.

FIG. 8 is a flowchart for explaining still another embodiment 16C of operation 16 of FIG. 1. Operation 16C includes operations 140 and 142 of determining a cluster to which a measurement point belongs to determine a class of a medium.

After operation 14, in operation 140, a determination is made as to which cluster the measurement point, which is formed by the features collected in the final feature space showing the relationship of the first predetermined number of intensities of light, belongs.

After operation 140, in operation 142, a class of a medium corresponding to the determined cluster including the measurement point is determined as a class of a medium on which an image is to be formed.

When the first predetermined number is determined as "2", the $m^{th}$ feature $\overline{x}_m$ and the $m+j^{th}$ feature $\overline{x}_{m+j}$ are selected when the first predetermined number is determined, first and second clusters exist in the final feature space, and the first and second clusters correspond to a plain medium and a photographic medium, respectively.

Figure 9A:
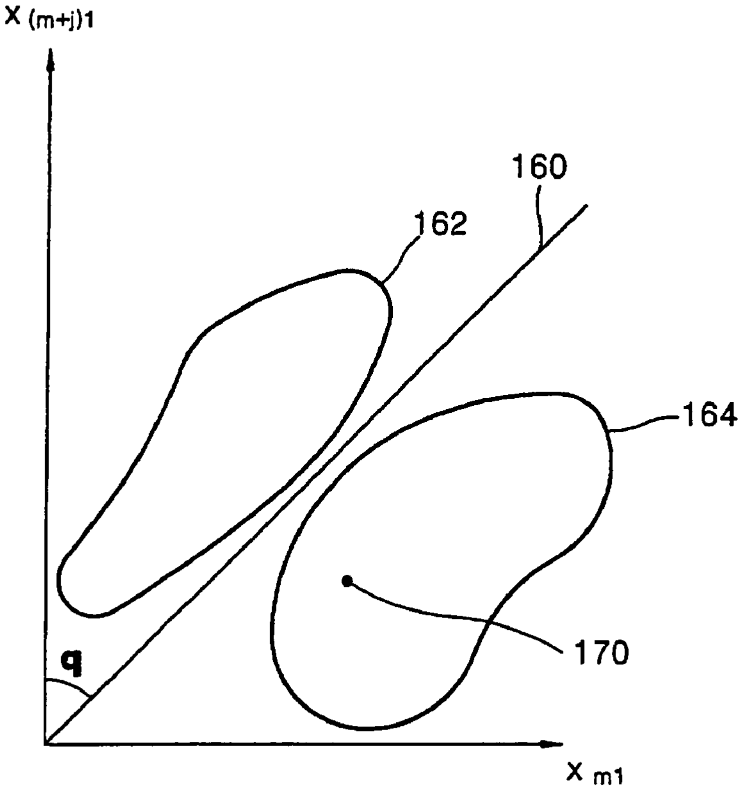
FIGS. 9A and 9B are exemplary views showing a final feature space for explaining operation 16C of FIG. 8.
Figure 9B:
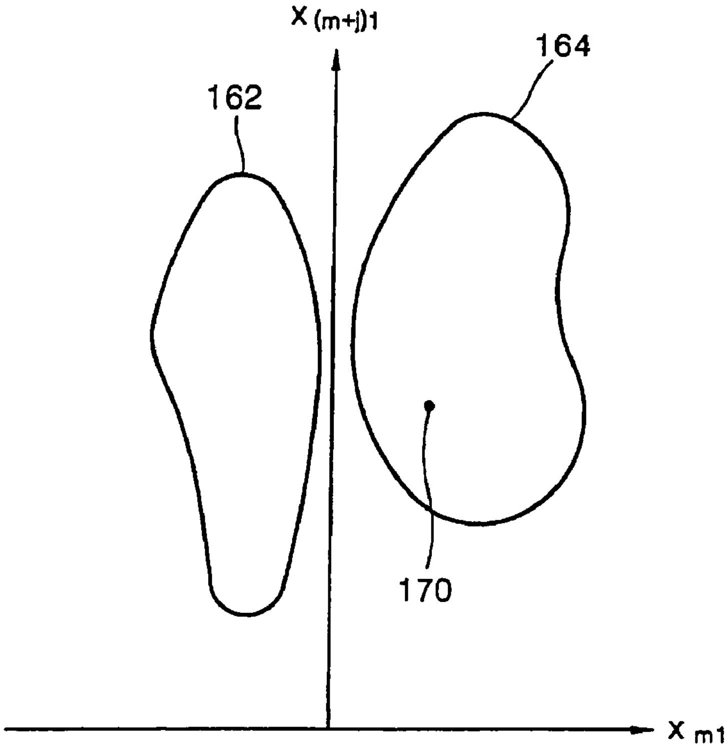

Operation 16C of FIG. 8 will now be exemplarily explained. FIGS. 9A and 9B are exemplary views for showing the final feature space for explaining operation 16C of FIG. 8. The final feature space of FIG. 9A or 9B includes first and second clusters 162 and 164 and a measurement point 170.

For example, it is assumed that the first and second clusters 162 and 164 exist in the final feature space as shown in FIG. 9A. Here, the first and second clusters 162 and 164 may be separated by a straight line 160. In this case, in operation 140, coordinates $(x_{m1}, x_{(m+j)1})$ of the measurement point 170 are compared with coordinates to indicate a region of the second cluster 164 to determine whether the measurement point 170 belongs to the second cluster 164.

In such a case, coordinates of the measurement point 170 are represented as two coordinate values. Thus, a time required to compare the measurement point 170 and the region of the second cluster 164 increases. To solve this problem, the coordinates of the measurement point 170 included in the second cluster 164 may be simplified. In other words, a coordinate axis of the final feature space of FIG. 9A moves, as shown in FIG. 9B. To be more specific in FIG. 9A, the straight line 160 to separate the first and second clusters 162 and 164 moves to the left by θ. As a result, the coordinates of the measurement point 170 may be represented only by $x_{m1}$. As described above, if a coordinate axis is transformed, whether a measured value belongs to a particular cluster may be easily and quickly determined in operation 140.

As previously described, non-linear operation 16A or 16B of FIG. 3 or 6, or linear operation 16C of FIG. 8 may be performed to discriminate the class of the medium of FIG. 8.

Figure 10:
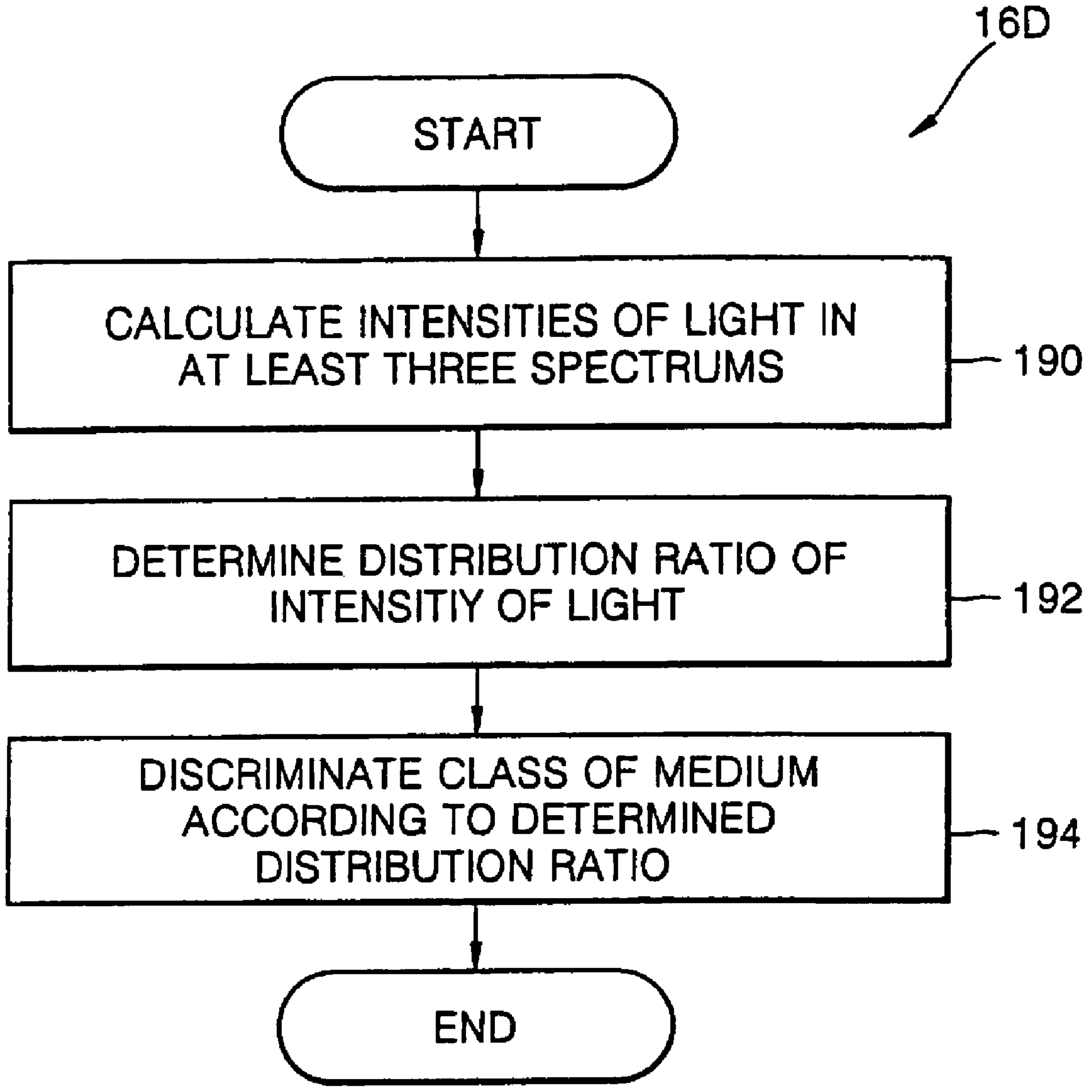
FIG. 10 is a flowchart for explaining yet another embodiment of operation 16 of FIG. 1.

FIG. 10 is a flowchart for explaining yet another embodiment 16D of operation 16 of FIG. 1. Operation 16D includes operations 190, 192, and 194 of calculating intensities and determining the class of the medium using a distribution ratio of intensities of light obtained in each spectrum.

After operation 14, in operation 190, the intensities of the sensed light are classified into at least three spectrums using the collected features. Here, the at least three spectrums may be cyan (C), magenta (M), and yellow (Y) spectrums.

After operation 190, in operation 192, a distribution ratio of the intensities of light in each of the at least three spectrums is determined. After operation 192, in operation 194, the class of the medium is discriminated according to the determined distribution ratio.

For example, after operation 190, in operation 192, relative magnitudes of the intensities of light may be determined. After operation 192, the class of the medium may be discriminated according to the determined relative magnitudes of the intensities of light. If the intensity of cyan light is greater than the intensity of magenta or yellow light, the class of the medium, i.e., the color of the medium, may be determined as cyan.

The structure and operation of an apparatus to discriminate a class of a medium on which an image is to be formed, according to the embodiment of the present invention, will now be described.

Figure 11:
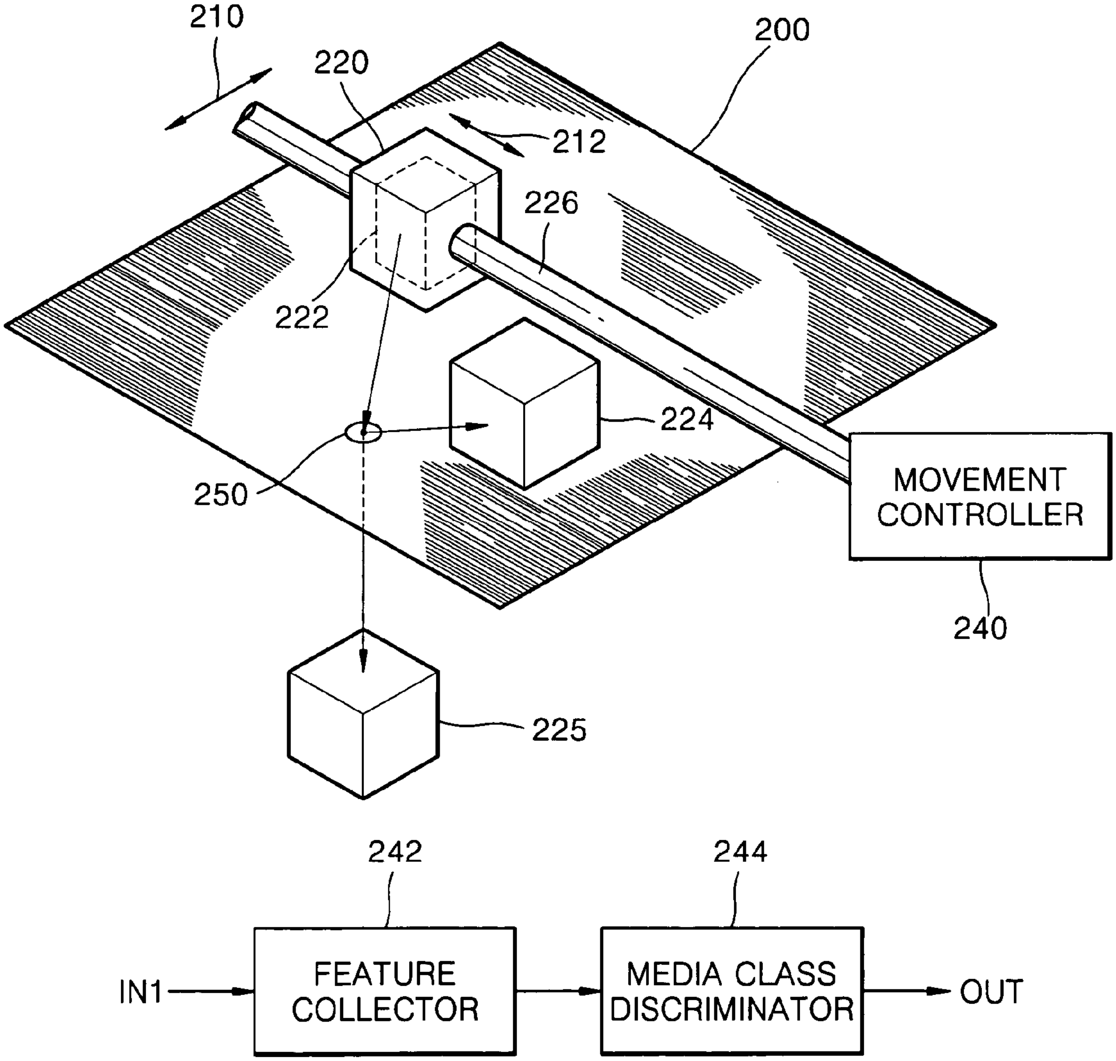
FIG. 11 is a view for explaining an apparatus to discriminate classes of media to form images, according to the embodiment of the present invention.

FIG. 11 is a view for explaining an apparatus to discriminate a class of a medium to form an image. Referring to FIG. 11, the apparatus includes a carrier 220, a light emitting part 222, a light receiving part 224, a movement controller 240, a feature collector 242, and a media class discriminator 244. Here, reference number 200 represents a medium.

The apparatus of FIG. 11 discriminates the class of the medium on which the image is to be formed, may be included in the image forming apparatus, and may perform the method of FIG. 1.

The carrier 220 moves together with one of the light emitting part 222 and the light receiving part 224 in response to a movement control signal output from the movement controller 240. For example, the carrier 220 may carry the light emitting part 222 or the light receiving part 224. For example, if the carrier 220 carries the light emitting part 222, the light receiving part 224 may be prepared over or below the medium 200. If the carrier 220 carries the light receiving part 224, the light emitting part 222 may be prepared over or below the medium 200. If light affected by the medium 200 is light reflected from the medium 200, the light emitting part 222 (or the light receiving part 224), which is moving with the carrier 220, and the light receiving part 224 (or the light emitting part 222), which is not moving, may be prepared over the medium 200. However, if the light affected by the medium 200 is light passing the medium 200, the light emitting part 222 (or the light receiving part 224), which is moving with the carrier 220, may be prepared over the medium 200, while the light receiving part 224 (or the light emitting part 222), which is not moving, may be prepared below the medium 200.

In order to explain the apparatus of FIG. 11, it is assumed that the light emitting part 222 moves with the carrier 220 and the light receiving part 224 (or 225) is fixed. However, the situation in which the light emitting part 222 is fixed is similar, and thus a description thereof is omitted.

To perform operation 10 of FIG. 1, the light emitting part 222 emits light to the medium 200. At least one light emitting part 222 may be prepared. Here, the carrier 220 carrying the light emitting part 222 moves to a predetermined position in at least one of a vertical direction 210 and a horizontal direction 212 that is parallel to a carrier shaft 226 in response to the movement control signal output from the movement controller 240. For this, the movement controller 240 may include a motor (not shown) which generates the movement control signal so as to correspond to the predetermined movement position and moves the carrier 220 in response to the generated movement control signal. Here, the predetermined movement position is shown in parameters $X_{mn}$ of a virtual number of features, the virtual number being determined as a first predetermined number. Thus, the predetermined position is determined when the first predetermined number is determined. Accordingly, light formed over the medium 200 moves with the movement of the carrier 220.

To perform operation 12, the light receiving part 224 or 225 senses the light affected by the medium 200, i.e., light reflected from a portion 250 of the medium 200 or light passing the portion 250 of the medium 200. At least one light receiving part 224 or 225 may be prepared.

To perform operation 14, the feature collector 242 receives the light sensed by the light receiving part 224 or 225 via an input node IN1 and collects the first predetermined number of features. For this, the feature collector 242 may receive a parameter corresponding to the intensity of the sensed light shown in the collected features from the movement controller 240 via the input node IN1 or may store the parameter in advance. For example, the feature collector 242 may receive a movement distance of the carrier 220 as a parameter from the movement controller 240 and the sensed light from the light receiving part 224 to generate a feature including the movement distance and the intensity of light. The feature collector 242 may include a counter (not shown), which performs a count operation when the carrier 220 begins to start moving, to determine as a time parameter the result counted whenever receiving the sensed light from the light receiving part 224 or 225 via the input node IN1 and generate a feature including the time parameter and the intensity of light.

To perform operation 16, the media class discriminator 244 discriminates the class of the medium based on collected features input from the feature collector 242 and outputs the discriminated class of the medium via an output node OUT.

Figure 12:
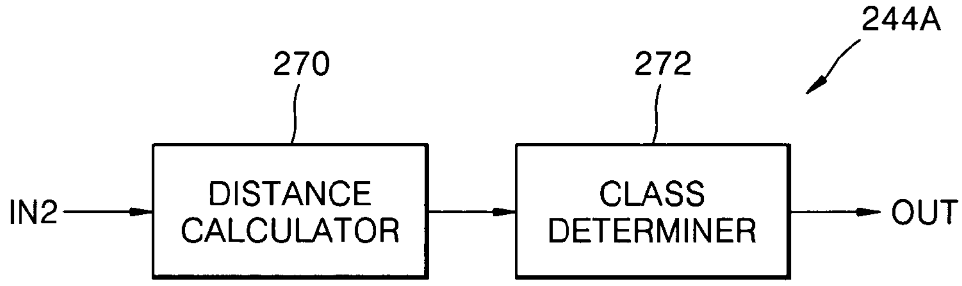
FIG. 12 is a block diagram of an embodiment of the media class discriminator of FIG. 11.

FIG. 12 is a block diagram of an embodiment 244A of the media class discriminator 244 of FIG. 11. Referring to FIG. 12, the media class discriminator 244A includes a distance calculator 270 and a class determiner 272.

The media class discriminator 244A may be used to perform operation 16A of FIG. 3.

To perform operation 50, the distance calculator 270 calculates distances from a measurement point, which is formed by features collected in a final feature space showing the relationship of the first predetermined number of intensities of light, to central points of clusters in the final feature space, and then outputs the calculation result to the class determiner 272. For this, the distance calculator 270 may calculate coordinates of the measurement point from the first predetermined number of features which are input from the feature collector 242 via an input node IN2, compare the calculated coordinates of the measurement point with coordinates of the central points of the clusters which have been previously stored to calculate the distances from the measurement point to the central points of the clusters.

To perform operation 52, the class determiner 272 identifies a cluster with a predetermined central point which is closest to the measurement point, based on the calculated distances input from the distance calculator 270, determines a class of a medium corresponding to the identified cluster as a medium on which an image is to be formed, and outputs the determined class of the medium via the output node OUT. For this, the class determiner 272 stores classes of media respectively corresponding to the clusters in advance, senses the class of the medium corresponding to the cluster with the predetermined central point which is closest to the measurement point, and determines the class of the medium on which the image is to be formed.

Figure 13:
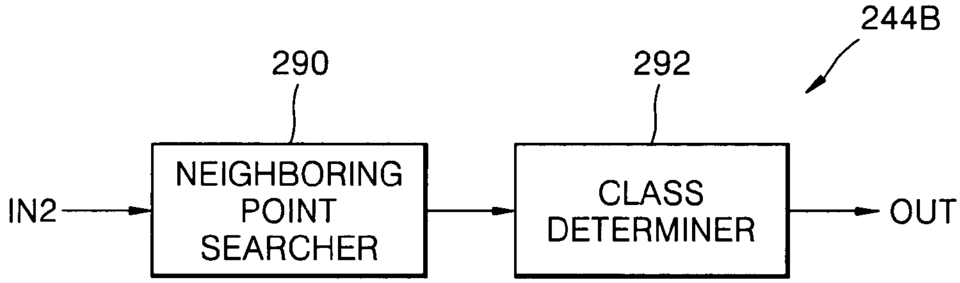
FIG. 13 is a block diagram of another embodiment of the media class discriminator of FIG. 11.

FIG. 13 is a block diagram of another embodiment 244B of the media class discriminator 244 of FIG. 11. The media class discriminator 244B includes a neighboring point searcher 290 and a class determiner 292. The media discriminator 244B may be realized as shown in FIG. 13 to perform operation 16B of FIG. 6.

To perform operation 100, the neighboring point searcher 290 searches a second predetermined number of neighboring points which are closest to the measurement point formed by the features collected in the final feature space showing the relationship of the first predetermined number of intensities of light. For this, the neighboring point searcher 290 may calculate coordinates of the measurement point from the first predetermined number of features which are input from the feature collector 242 via the input node IN2, and compare the calculated coordinates of the measurement point with pre-stored coordinates of points in the final feature space to search the second predetermined number of neighboring points.

To perform operation 102, the class determiner 292 determines the class of the medium, which is indicated by as many labels as the second predetermined number of neighboring points searched by the neighboring point searcher 290, as the class of the medium on which the image is to be formed and outputs the determined class of the medium via the output node OUT.

For example, the neighboring point searcher 290 may output the labels of the second predetermined number of searched neighboring points to the class determiner 292. In this case, the class determiner 292 may analyze information stored in the labels input from the neighboring point searcher 290, i.e., information to indicate the classes of media respectively corresponding to the neighboring points, and determine the class of the medium, which is indicated by the labels, as the class of the medium on which the image is to be formed.

Figure 14:
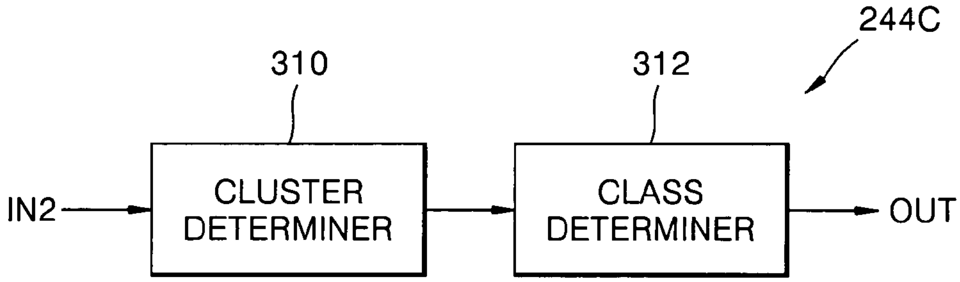
FIG. 14 is a block diagram of still another embodiment of the media class discriminator of FIG. 11.

FIG. 14 is a block diagram of still another embodiment 244C of the media class discriminator 244 of FIG. 11. Referring to FIG. 14, the media class discriminator 244C includes a cluster determiner 310 and a class determiner 312. The media class discriminator 244 may perform operation 16C of FIG. 8.

To perform operation 140, the cluster determiner 310 determines which of the clusters separated in the final feature space includes the measurement point, which is formed by the features collected in the final feature space showing the relationship of the first predetermined number of intensities of light, and outputs the determination result to the class determiner 312. For this, the cluster determiner 310 may calculate coordinates of the measurement point from the first predetermined number of features which are input from the feature collector 242 via the input node IN2, and compare the calculated coordinates of the measurement point with a pre-stored region of respective clusters to determine which of the clusters includes the measurement point.

Figure 15:
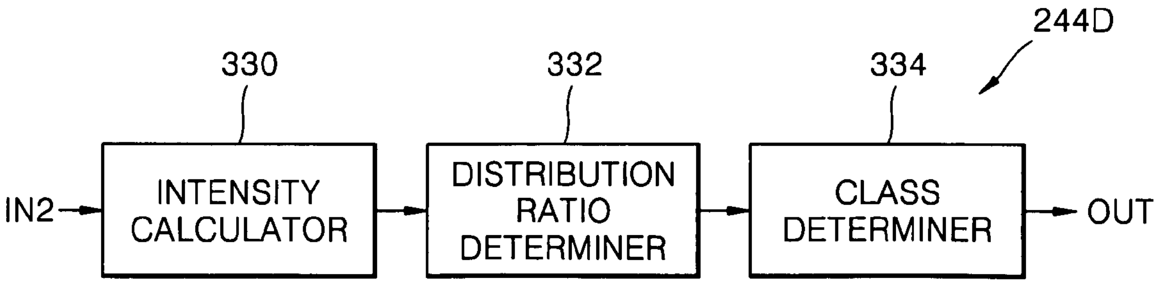
FIG. 15 is a block diagram of yet another embodiment of the media class discriminator of FIG. 11.

To perform operation 142, the class determiner 312 determines a class of a medium corresponding to the cluster determined by the cluster determiner 310 as the class of the medium on which the image is to be formed and outputs the determination result via the output node OUT. For this, the class determiner 312 may pre-store the classes of the media respectively corresponding to the clusters and output the class of the medium corresponding to the determined cluster, which is input from the class determiner 310, via the output node OUT FIG. 15 is a block diagram of yet another embodiment 244D of the media class discriminator 244 of FIG. 11. Referring to FIG. 15, the class discriminator 244D includes an intensity calculator 330, a distribution ratio determiner 332, and a class determiner 334. The media class discriminator 244D may be realized as shown in FIG. 15 to perform operation 16D of FIG. 10.

To perform operation 190, the intensity calculator 330 classifies the sensed intensity of light into at least three spectrums using the collected features input from the feature collector 242 via the input node IN2 and outputs the intensities of light according to the spectrum to the distribution ratio determiner 332.

To perform operation 192, the distribution ratio determiner 332 determines a distribution ratio of the intensities of light according to the spectrum which are input from the intensity calculator 330 and outputs the determined distribution ratio to the class determiner 334.

To perform operation 194, the class determiner 334 discriminates the class of the medium according to the determined distribution ratio and outputs the discrimination result via the output node OUT.

The class discriminator 244D may include at least three light receiving parts which sense the respective spectrums, or may include one light receiving part which sequentially senses at least three spectrums.

Accordingly, the image forming apparatus may identify the class of the medium output from the media class discriminator 244 of FIG. 11 and form a uniform image based on the identification result regardless of the class of the medium.

As described above, in a method and an apparatus to discriminate a class of medium to form an image, according to the embodiments of the present invention, the features of light reflected from or passing the medium are collected by moving a light receiving part or a light emitting part. Thus, a plurality of light receiving parts are not necessary, which results in a reduction in the volume and production cost of the image forming apparatus. In other words, abundant features can be collected using only a single light emitting part and a single light receiving part at a low cost. As a result, the class of the medium can be exactly determined so that the image forming apparatus can always form a uniform image regardless of the class of the medium.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of determining a class of a medium to form an image using an image forming apparatus which comprises a light emitting part that emits light and a light receiving part that senses the light, the method comprising:

emitting the light to the medium;

sensing the emitted light which is affected by the medium;

collecting a first predetermined number of features which are represented by a relationship between a parameter of the medium and an intensity of the light sensed by the light receiving part; and determining the class of the medium using the collected features according to clusters of the features, wherein one of the light emitting part and the light receiving part moves independently of the other of the light emitting part and the light receiving part to emit or sense the light, and the parameter varies with the movement of the light emitting part or the light receiving part.

2. The method of claim 1, wherein one of the light emitting part and the light receiving part moves in a vertical direction.

3. The method of claim 1, wherein a position to which the light emitting part or the light receiving part moves is predetermined.

4. The method of claim 1, wherein the light affected by the medium corresponds to light reflected from the medium or light passing through the medium.

5. The method of claim 3, further comprising:

measuring features of a plurality of test media;

determining a region of interest which includes the measured features of the test media, the features being related to classes of the test media and which are common to the test media;

selecting a virtual number of the features from the region of interest and determining the virtual number as the first predetermined number when the clusters are separated in a virtual feature space which shows relationships of a virtual number of intensities of light, wherein a movement position of the light emitting part or the light receiving part appears in the parameter of the virtual number of features.

6. The method of claim 1, wherein the determining of the class of the medium using the collected features comprises:

obtaining distances from a measurement point, which is formed by features collected in a final feature space showing relationships of the first predetermined number of intensities of light to predetermined central points of the clusters in the final feature space; and determining a shortest distance of the obtained distances, identifying the cluster with the predetermined central point used to calculate the shortest distance, and determining the class of the medium corresponding to the identified cluster as the class of the medium on which the image is to be formed.

7. The method of claim 6, further comprising:

setting a virtual boundary discriminating the clusters separated in the final feature space;

determining the classes of the test media using the final feature space in which the virtual boundary has been set;

determining whether an error rate of failing to determine the classes of the test media is within an allowable error rate; and determining the virtual boundary as a final boundary and obtaining the central points of the clusters in the final feature space with the final boundary if determined that the error rate is within the allowable error rate; and resetting the virtual boundary if determined that the error rate is not within the allowable error rate.

8. The method of claim 1, wherein the determining of the class of the medium using the collected features comprises:

determining which of the clusters separated in a final feature space comprises a measurement point which is formed by the features collected in the final feature space showing the relationships of the first predetermined number of intensities of light; and determining the class of the medium corresponding to the determined cluster as the class of the medium on which the image is formed.

9. The method of claim 8, further comprising:

moving a coordinate axis of the final feature space to represent coordinates of points of the clusters.

10. The method of claim 7, wherein the setting and the resetting of the virtual boundary occur before the emitting and sensing of the light.

11. The method of claim 8, further comprising comparing coordinates of the measurement point with coordinates which indicate a region of a respective one of the clusters to determine whether the measurement point belongs to the respective cluster.

12. The method of claim 8, wherein the determining of the class of the medium comprises using a linear operation.

13. The method of claim 8, wherein the determining of the class of the medium comprises using a non-linear operation.

14. The method of claim 1, wherein one of the light emitting part and the light receiving part moves in a horizontal direction.

15. A method of determining a class of a medium to form an image using an image forming apparatus which comprises a light emitting part that emits light and a light receiving part that senses the light, the method comprising:

emitting the light to the medium;

sensing the emitted light which is affected by the medium;

collecting a first predetermined number of features which are represented by a relationship between a parameter of the medium and an intensity of the light sensed by the light receiving part; and determining the class of the medium using the collected features, wherein one of the light emitting part and the light receiving part moves to emit or sense the light, and the parameter varies with the movement of the light emitting part or the light receiving part, wherein the parameter corresponds to one of a movement distance and a time to move the light emitting part or the light receiving part, the movement distance and the time being represented in a 3-dimensional space.

16. A method of determining a class of a medium to form an image using an image forming apparatus which comprises a light emitting part that emits light and a light receiving part that senses the light, the method comprising:

emitting the light to the medium;

sensing the emitted light which is affected by the medium;

collecting a first predetermined number of features which are represented by a relationship between a parameter of the medium and an intensity of the light sensed by the light receiving part; and determining the class of the medium using the collected features, wherein one of the light emitting part and the light receiving part moves independently of the other of the light emitting part and the light receiving part to emit or sense the light, and the parameter varies with the movement of the light emitting part or the light receiving part, wherein the determining of the class of the medium using the collected features comprises:

searching a second predetermined number, which is an odd number, of neighboring points which are closest to a measurement point which is formed by the features collected in a final feature space showing the relationships of the first predetermined number of intensities of light; and determining the class of the medium, which is indicated by as many labels as the neighboring points, as the class of the medium on which the image is to be formed, wherein the label of a $p^{th}$ neighboring point of the second predetermined number of neighboring points comprises information regarding the class of the medium corresponding to the $p^{th}$ neighboring point.

17. The method of claim 16, further comprising:

setting a temporary second predetermined number;

obtaining the temporary second predetermined number of test neighboring points, which are the closest to a test measurement point, and determining classes of test media using the test measurement point and the test neighboring points;

determining whether an error rate of failing to determine the classes of the test medium is within an allowable error rate;

determining the temporary second predetermined number as a final value of the second predetermined number if determined that the error rate is within the allowable error rate; and resetting the temporary second predetermined number if determined that the error rate is not within the allowable error rate.

18. A method of determining a class of a medium to form an image using an image forming apparatus which comprises a light emitting part that emits light and a light receiving part that senses the light, the method comprising:

emitting the light to the medium;

sensing the emitted light which is affected by the medium;

collecting a first predetermined number of features which are represented by a relationship, between a parameter of the medium and an intensity of the light sensed by the light receiving part; and determining the class of the medium using the collected features, wherein one of the light emitting part and the light receiving part moves independently of the other of the light emitting part and the light receiving part to emit or sense the light, and the parameter varies with the movement of the light emitting part or the light receiving part, wherein the determination of the class of the medium comprises:

obtaining the intensity of the sensed light, the sensed light being classified into first through third spectrums using the collected features;

determining a distribution ratio of the intensities of the sensed light in each of the first through third spectrums; and determining the class of the medium according to the distribution ratio.

19. The method of claim 18, wherein the first through third spectrums are a cyan, a magenta and a yellow spectrum.

20. An apparatus to determine a class of a medium on which an image is formed, the apparatus comprising:

a light emitting part which emits light to the medium;

a light receiving part which senses light affected by the medium;

a carrier which moves with one of the light emitting part and the light receiving part independently of the other of the light emitting part and the light receiving part in response to a movement control signal;

a feature collector which collects a first predetermined number of features of the medium; and a media class discriminator which determines the class of the medium using clusters of the collected features, wherein the features are represented by a relationship between a parameter of the medium, which varies with the movement of the carrier, and an intensity of the light sensed by the light receiving part.

21. The apparatus of claim 20, wherein the carrier moves in a vertical direction.

22. The apparatus of claim 20, wherein the light receiving part senses light reflected from the medium or light passing through the medium.

23. The apparatus of claim 20, where the media class discriminator comprises:

a distance calculator which calculates distances from a measurement point, which is formed by the features collected in a final feature space showing relationships of the first predetermined number of intensities of light, to central points of the clusters in the final feature space; and a class determiner which identifies the cluster with the central point which is closest to the measurement point, based on the calculated distances, and determines a class of the medium corresponding to the identified cluster as the class of the medium on which the image is to be formed.

24. The apparatus of claim 20, wherein the media class discriminator comprises:

a neighboring searcher which searches a second predetermined number of neighboring points which are closest to a measurement point which is formed by the features collected in a final feature space showing the relationships of the first predetermined number of intensities of light; and a class determiner which determines a most frequent class of the medium, among classes indicated by labels of the second predetermined number of neighboring points, as the class of the medium on which the image is formed, wherein the label of the $p^{th}$ neighboring point of the second predetermined number of neighboring points comprises information regarding the class of the medium corresponding to the $p^{th}$ neighboring point.

25. The method claim 20, wherein the media class discriminator comprises:

a cluster determiner to determine which of the clusters separated in a final feature space comprises a measurement point which is formed by the features collected in the final feature space showing the relationships of the first predetermined number of intensities of light; and a class determiner which determines the class of the medium corresponding to the determined cluster as the class of the medium on which the image is to be formed.

26. The apparatus of claim 20, wherein the media class discriminator further comprises:

a movement controller which generates a movement control signal to correspond to a predetermined movement position, wherein the carrier moves to the predetermined movement position in response to the movement control signal, the predetermined movement position appears in parameters of a virtual number of the features, the virtual number being the first predetermined number, and the virtual number corresponds to the number of intensities of light appearing in a virtual feature space with the separated clusters.

27. The apparatus of claim 20, wherein the carrier moves in a horizontal direction.

28. An apparatus to determine a class of a medium on which an image is formed, the apparatus comprising:

a light emitting part which emits light to the medium;

a light receiving part which senses light affected by the medium;

a carrier which moves with one of the light emitting part and the light receiving part independently of the other of the light emitting part and the light receiving part in response to a movement control signal;

a feature collector which collects a first predetermined number of features of the medium; and a media class discriminator which determines the class of the medium using the collected features, wherein the features are represented by a relationship between a parameter of the medium, which varies with the movement of the carrier, and an intensity of the light sensed by the light receiving part, wherein the media class discriminator comprises:

an intensity calculator which calculates the intensity of the sensed light and classifies the intensity of the sensed light into three spectrums using the collected features;

a distribution ratio determiner which determines a distribution ratio of the intensity of light in each of the three spectrums; and a class determiner which determines the class of the medium according to the distribution ratio.

29. A method of determining a class of a medium to form an image using an image forming apparatus which comprises a light emitting part that emits light and a light receiving part that senses the light, the method comprising:

emitting the light to the medium;

sensing the emitted light which is affected by the medium;

collecting a first predetermined number of features which are represented by a relationship between a parameter of the medium and an intensity of the light sensed by the light receiving part;

determining the class of the medium using the collected features, wherein one of the light emitting part and the light receiving part moves to emit or sense the light, and the parameter varies with the movement of the light emitting part or the light receiving part; and moving only one of the light emitting part and the light receiving part.

30. A method comprising:

independently moving one of an emitter to emit light to a recording medium or a sensor to sense the light passing through the recording medium;

collecting features which are represented by a relationship between a parameter of the medium and an intensity of the sensed light; and determining a class of the medium using the collected features, the parameter varying with the movement of the emitter or the sensor.

31. A method comprising:

independently moving an emitter to emit light to a recording medium or a sensor to sense the light affected by the recording medium;

collecting features which are represented by a relationship between a parameter of the medium and an intensity of the sensed light; and determining a class of the medium using the collected features, the parameter varying with the movement of the emitter or the sensor, wherein the moving comprises moving only one of the emitter and the sensor.

32. A method comprising:

independently moving an emitter to emit light to a recording medium or a sensor to sense the light affected by the recording medium;

determining intensities of the affected light at a plurality of angles; and determining a class of the medium according to clusters of the determined intensities.

33. A method comprising:

providing a single emitter to emit light to a recording medium and a single sensor to sense the light affected by the recording medium;

moving either the emitter or the sensor independently of the other of the emitter or the sensor;

collecting features which are represented by a relationship between a parameter of the medium and an intensity of the sensed light; and determining a class of the medium using clusters of the collected features.

* * * * *